(12) United States Patent  (10) Patent No.: US 7,124,944 B2
Selinfreund et al.  (45) Date of Patent: Oct. 24, 2006

(54) PRODUCT PACKAGING INCLUDING DIGITAL DATA

(75) Inventors: Richard H. Selinfreund, Guilford, CT (US); Rakesh Vig, Durham, CT (US)

(73) Assignee: Verification Technologies, Inc., Essex, CT (US)

( * ) Notice: Subject to any disclaimer, the term of this patent is extended or adjusted under 35 U.S.C. 154(b) by 0 days.

(21) Appl. No.: 10/262,816

(22) Filed: Oct. 2, 2002

(65) Prior Publication Data

US 2003/0047610 A1 Mar. 13, 2003

Related U.S. Application Data

(63) Continuation-in-part of application No. 09/608,886, filed on Jun. 30, 2000.

(60) Provisional application No. 60/326,706, filed on Oct. 2, 2001.

(51) Int. Cl.
*G06K 7/10* (2006.01)
(52) U.S. Cl. .................. 235/454; 235/487
(58) Field of Classification Search ........... 235/454, 235/455, 487, 491, 494, 462.01, 468; 359/2, 359/3, 17
See application file for complete search history.

(56) References Cited

U.S. PATENT DOCUMENTS

| | | | |
|---|---|---|---|
| 1,822,098 A | 9/1931 | Huntress | |
| 2,265,196 A | 12/1941 | Riley | |
| 2,521,124 A | 9/1950 | Miller | |
| 3,356,462 A | 12/1967 | Cooke et al. | |
| 3,412,245 A | 11/1968 | Halverson | |
| 3,444,517 A | 5/1969 | Rabinow | |
| 3,473,027 A | 10/1969 | Freeman et al. | |
| 3,500,047 A | 3/1970 | Berry | |
| 3,533,744 A | 10/1970 | Unger | |
| 3,591,283 A | 7/1971 | Peisach | |
| 3,624,644 A | 11/1971 | Higgins | |
| 3,649,464 A | 3/1972 | Freeman | |
| 3,662,181 A | 5/1972 | Hercher et al. | |
| 3,663,813 A | 5/1972 | Shaw | |
| 3,886,083 A | 5/1975 | Laxer | |
| 3,928,226 A | 12/1975 | McDonough et al. | |
| 3,992,158 A | 11/1976 | Przybylowicz et al. | |
| 3,996,006 A | 12/1976 | Pagano | |
| 4,015,131 A | 3/1977 | McDonough et al. | |
| 4,018,643 A | 4/1977 | Levine | |
| 4,038,151 A | 7/1977 | Fadler et al. | |
| 4,053,433 A | 10/1977 | Lee | |
| 4,077,845 A | 3/1978 | Johnson | |
| 4,078,656 A | 3/1978 | Crane et al. | |
| D248,044 S | 5/1978 | Odom, Jr. et al. | |
| 4,087,332 A | 5/1978 | Hansen | |
| 4,090,031 A | 5/1978 | Russell | |

(Continued)

FOREIGN PATENT DOCUMENTS

DE  2 118 928  11/1971

(Continued)

OTHER PUBLICATIONS

Amato, "Fomenting a Revolution in Miniature", Science, vol. 282, pp. 402-404 Oct. 16, 1998.

(Continued)

*Primary Examiner*—Steven S. Paik
(74) *Attorney, Agent, or Firm*—Kelley Drye & Warren LLP

(57) ABSTRACT

Light sensitive materials applied in shipping materials, including security seals and tear tape, for authentication, discrimination and recognition of items.

14 Claims, 1 Drawing Sheet

U.S. PATENT DOCUMENTS

| | | | |
|---|---|---|---|
| 4,118,280 A | 10/1978 | Charles et al. | |
| 4,146,792 A | 3/1979 | Stenzel et al. | |
| 4,154,795 A | 5/1979 | Thorne | |
| 4,202,491 A | 5/1980 | Suzuki | |
| 4,235,964 A | 11/1980 | Bochner | |
| 4,243,694 A | 1/1981 | Mansukhani | |
| 4,260,392 A | 4/1981 | Lee | |
| 4,329,317 A | 5/1982 | Detweiler et al. | |
| 4,365,970 A | 12/1982 | Lawrence et al. | |
| 4,382,064 A | 5/1983 | Detweiler et al. | |
| 4,387,112 A | 6/1983 | Blach | |
| 4,439,356 A | 3/1984 | Khanna et al. | |
| 4,450,231 A | 5/1984 | Ozkan | |
| 4,451,521 A | 5/1984 | Kaule et al. | |
| 4,451,530 A | 5/1984 | Kaule et al. | |
| 4,468,410 A | 8/1984 | Zeya | |
| 4,485,308 A | 11/1984 | Rabatin | |
| 4,486,536 A | 12/1984 | Baker et al. | |
| 4,501,496 A | 2/1985 | Griffin | |
| 4,514,085 A | 4/1985 | Kaye | |
| 4,540,595 A | 9/1985 | Acitelli et al. | |
| 4,542,288 A | 9/1985 | Drexler | |
| 4,557,900 A | 12/1985 | Heitzmann | |
| 4,567,370 A | 1/1986 | Falls | |
| 4,577,289 A | 3/1986 | Comerford et al. | |
| 4,589,551 A | 5/1986 | Hellon | |
| 4,589,743 A | 5/1986 | Clegg | |
| 4,598,205 A | 7/1986 | Kaule et al. | |
| 4,620,776 A | 11/1986 | Ima | |
| 4,631,174 A | 12/1986 | Kondo | |
| 4,632,901 A | 12/1986 | Valkirs et al. | |
| 4,642,526 A | 2/1987 | Hopkins | |
| 4,677,604 A | 6/1987 | Selby, III et al. | |
| 4,734,796 A | 3/1988 | Grynberg et al. | |
| 4,736,425 A | 4/1988 | Jalon | |
| 4,746,631 A | 5/1988 | Clagett | |
| 4,756,557 A | 7/1988 | Kaule et al. | |
| 4,767,205 A | 8/1988 | Schwartz et al. | |
| 4,789,804 A | 12/1988 | Karube et al. | |
| 4,806,316 A | 2/1989 | Johnson et al. | |
| 4,818,677 A | 4/1989 | Hay-Kaufman et al. | |
| 4,823,210 A | 4/1989 | Bond | |
| 4,844,962 A * | 7/1989 | May et al. | 428/43 |
| 4,849,836 A | 7/1989 | Kachikian | |
| 4,856,857 A * | 8/1989 | Takeuchi et al. | 359/3 |
| 4,858,036 A | 8/1989 | Ginkel | |
| 4,865,812 A | 9/1989 | Kuntz et al. | |
| 4,866,769 A | 9/1989 | Karp | |
| 4,879,704 A | 11/1989 | Takagi et al. | |
| 4,882,195 A | 11/1989 | Butland | |
| 4,889,365 A | 12/1989 | Chouinard | |
| 4,897,173 A | 1/1990 | Nankai et al. | |
| 4,921,280 A | 5/1990 | Jalon | |
| 4,927,180 A * | 5/1990 | Trundle et al. | 283/70 |
| 4,948,442 A | 8/1990 | Manns | |
| 4,966,856 A | 10/1990 | Ito et al. | |
| 4,975,898 A | 12/1990 | Yoshida | |
| 4,983,817 A | 1/1991 | Dolash et al. | |
| 5,005,873 A | 4/1991 | West | |
| 5,018,866 A | 5/1991 | Osten | |
| 5,027,396 A | 6/1991 | Platteter et al. | |
| 5,030,421 A | 7/1991 | Muller | |
| 5,030,832 A | 7/1991 | Williams et al. | |
| 5,039,490 A | 8/1991 | Marsoner et al. | |
| 5,047,215 A | 9/1991 | Manns | |
| 5,049,673 A | 9/1991 | Tsien et al. | |
| 5,075,147 A | 12/1991 | Usami et al. | |
| 5,080,546 A | 1/1992 | Purvin et al. | |
| 5,093,147 A | 3/1992 | Andrus et al. | |
| 5,106,582 A | 4/1992 | Baker | |
| 5,118,349 A | 6/1992 | Jalon | |
| 5,128,243 A | 7/1992 | Potter et al. | |
| 5,128,882 A | 7/1992 | Cooper et al. | |
| 5,135,569 A | 8/1992 | Mathias | |
| 5,139,812 A | 8/1992 | Lebacq | |
| 5,147,042 A | 9/1992 | Levy | |
| 5,176,257 A | 1/1993 | Levy | |
| 5,182,669 A | 1/1993 | Chikuma et al. | |
| 5,194,289 A | 3/1993 | Butland | |
| 5,200,051 A | 4/1993 | Cozzette et al. | |
| 5,204,852 A | 4/1993 | Nakagawa et al. | |
| 5,208,630 A | 5/1993 | Goodbrand et al. | |
| 5,243,411 A | 9/1993 | Shirochi et al. | |
| 5,246,869 A | 9/1993 | Potter et al. | |
| 5,260,032 A | 11/1993 | Muller | |
| 5,264,103 A | 11/1993 | Yoshioka et al. | |
| 5,265,082 A | 11/1993 | Gniewek et al. | |
| 5,267,311 A | 11/1993 | Bakhoum | |
| 5,272,090 A | 12/1993 | Gavish et al. | |
| 5,279,967 A | 1/1994 | Bode | |
| 5,282,894 A | 2/1994 | Albert et al. | |
| 5,286,286 A | 2/1994 | Winnik et al. | |
| 5,292,000 A | 3/1994 | Levy | |
| 5,292,855 A | 3/1994 | Krutak et al. | |
| 5,311,494 A | 5/1994 | Sugita et al. | |
| 5,313,264 A | 5/1994 | Ivarsson et al. | |
| 5,319,436 A | 6/1994 | Manns et al. | |
| 5,319,475 A * | 6/1994 | Kay et al. | 359/2 |
| 5,321,261 A | 6/1994 | Valenta | |
| 5,336,714 A | 8/1994 | Krutak et al. | |
| 5,338,066 A | 8/1994 | Gundjian | |
| 5,338,067 A | 8/1994 | Gundjian | |
| 5,360,628 A | 11/1994 | Butland | |
| 5,366,902 A | 11/1994 | Cox et al. | |
| 5,379,433 A | 1/1995 | Yamagishi | |
| 5,381,476 A | 1/1995 | Kimoto et al. | |
| 5,399,451 A | 3/1995 | Hashida et al. | |
| 5,400,319 A | 3/1995 | Fite et al. | |
| 5,409,583 A | 4/1995 | Yoshioka et al. | |
| 5,409,666 A | 4/1995 | Nagel et al. | |
| 5,418,852 A | 5/1995 | Itami et al. | |
| 5,418,855 A | 5/1995 | Liang et al. | |
| 5,421,869 A | 6/1995 | Gundjian et al. | |
| 5,424,959 A | 6/1995 | Reyes et al. | |
| 5,426,625 A | 6/1995 | Bui et al. | |
| 5,429,952 A | 7/1995 | Garner et al. | |
| 5,430,281 A | 7/1995 | Lentz et al. | |
| 5,438,403 A | 8/1995 | Hoshino et al. | |
| 5,450,190 A | 9/1995 | Schwartz et al. | |
| 5,452,466 A | 9/1995 | Fettweis | |
| 5,453,968 A | 9/1995 | Veldhuis et al. | |
| 5,457,527 A | 10/1995 | Manns et al. | |
| 5,461,239 A | 10/1995 | Atherton | |
| 5,468,650 A | 11/1995 | Skov et al. | |
| 5,473,584 A | 12/1995 | Oshima | |
| 5,475,468 A | 12/1995 | Natsudaira | |
| 5,483,363 A * | 1/1996 | Holmes et al. | 359/2 |
| 5,494,638 A | 2/1996 | Gullick | |
| 5,496,701 A | 3/1996 | Pollard-Knight | |
| 5,498,549 A | 3/1996 | Nagel et al. | |
| 5,510,163 A | 4/1996 | Sullivan | |
| 5,513,169 A | 4/1996 | Fite et al. | |
| 5,513,260 A | 4/1996 | Ryan | |
| 5,516,362 A | 5/1996 | Gundjian et al. | |
| 5,521,984 A | 5/1996 | Denenberg et al. | |
| 5,525,516 A | 6/1996 | Krutak et al. | |
| 5,532,104 A | 7/1996 | Goto | |
| 5,538,773 A | 7/1996 | Kondo | |
| 5,545,567 A | 8/1996 | Gretillat et al. | |
| 5,546,471 A | 8/1996 | Merjanian | |
| 5,547,501 A | 8/1996 | Maruyama et al. | |
| 5,563,947 A | 10/1996 | Kikinis | |
| 5,568,177 A | 10/1996 | Talvalkar et al. | |
| 5,569,317 A | 10/1996 | Sarada et al. | |

| | | | | | | |
|---|---|---|---|---|---|---|
| 5,569,613 | A | 10/1996 | Yang | 5,815,484 | A | 9/1998 | Smith |
| 5,570,379 | A | 10/1996 | Sasaki et al. | 5,818,582 | A | 10/1998 | Fernandez et al. |
| 5,572,589 | A | 11/1996 | Waters et al. | 5,822,473 | A | 10/1998 | Magel et al. |
| 5,574,787 | A | 11/1996 | Ryan | 5,837,042 | A | 11/1998 | Lent et al. |
| 5,574,790 | A | 11/1996 | Liang et al. | 5,841,861 | A | 11/1998 | Kondo et al. |
| 5,582,697 | A | 12/1996 | Ikeda et al. | 5,847,141 | A | 12/1998 | Malkin |
| 5,587,984 | A | 12/1996 | Owa et al. | 5,851,489 | A | 12/1998 | Wolf et al. |
| 5,589,350 | A | 12/1996 | Bochner | 5,856,174 | A | 1/1999 | Lipshutz et al. |
| 5,592,454 | A | 1/1997 | Tobita et al. | 5,861,618 | A | 1/1999 | Berson |
| 5,592,561 | A | 1/1997 | Moore | 5,867,586 | A | 2/1999 | Liang et al. |
| 5,596,639 | A | 1/1997 | Kikinis | 5,874,219 | A | 2/1999 | Rava et al. |
| 5,598,399 | A | 1/1997 | Ogihara et al. | 5,881,038 | A | 3/1999 | Oshima et al. |
| 5,599,578 | A | 2/1997 | Butland | 5,895,073 | A | 4/1999 | Moore |
| 5,605,738 | A * | 2/1997 | McGinness et al. ..... 428/195.1 | 5,905,800 | A | 5/1999 | Moskowitz et al. |
| 5,608,225 | A | 3/1997 | Kamimura et al. | 5,907,144 | A | 5/1999 | Poon et al. |
| 5,608,717 | A | 3/1997 | Ito et al. | 5,915,027 | A | 6/1999 | Cox et al. |
| 5,611,433 | A | 3/1997 | Levy | 5,919,712 | A | 7/1999 | Herron et al. |
| 5,611,958 | A | 3/1997 | Takeuchi et al. | 5,922,188 | A | 7/1999 | Ikeda et al. |
| 5,613,001 | A | 3/1997 | Bakhoum | 5,922,550 | A | 7/1999 | Everhart et al. |
| 5,614,008 | A | 3/1997 | Escano et al. | 5,922,591 | A | 7/1999 | Anderson et al. |
| 5,615,061 | A | 3/1997 | Singh | 5,922,594 | A | 7/1999 | Lofas |
| 5,618,682 | A | 4/1997 | Scheirer | 5,923,413 | A | 7/1999 | Laskowski |
| 5,625,706 | A | 4/1997 | Lee et al. | 5,923,754 | A | 7/1999 | Angelo et al. |
| 5,629,512 | A * | 5/1997 | Haga .......................... 235/468 | 5,927,547 | A | 7/1999 | Papen et al. |
| 5,629,914 | A | 5/1997 | Clark et al. | 5,930,215 | A | 7/1999 | Fite et al. |
| 5,631,170 | A | 5/1997 | Attridge | 5,933,498 | A | 8/1999 | Schneck et al. |
| 5,632,959 | A | 5/1997 | Mohajer | 5,936,878 | A | 8/1999 | Arsenov et al. |
| 5,633,836 | A | 5/1997 | Langer et al. | 5,937,164 | A | 8/1999 | Mages et al. |
| 5,636,292 | A | 6/1997 | Rhoads | 5,939,024 | A | 8/1999 | Robertson |
| 5,641,640 | A | 6/1997 | Hanning | 5,945,252 | A | 8/1999 | Sokoluk et al. |
| 5,644,444 | A | 7/1997 | Braithwaite et al. | D414,272 | S | 9/1999 | O'Bear et al. |
| 5,644,566 | A | 7/1997 | Nakayama et al. | 5,949,601 | A | 9/1999 | Braithwaite et al. |
| 5,648,197 | A | 7/1997 | Kuroda | 5,953,417 | A | 9/1999 | Quan |
| 5,650,062 | A | 7/1997 | Ikeda et al. | 5,955,352 | A | 9/1999 | Inoue et al. |
| 5,651,869 | A | 7/1997 | Yoshioka et al. | 5,955,729 | A | 9/1999 | Nelson et al. |
| 5,652,838 | A | 7/1997 | Lovett et al. | 5,958,541 | A | 9/1999 | Miller et al. |
| 5,661,703 | A | 8/1997 | Moribe et al. | 5,961,926 | A | 10/1999 | Kolb et al. |
| 5,665,151 | A | 9/1997 | Escano et al. | 5,963,536 | A | 10/1999 | Vasic et al. |
| 5,670,003 | A * | 9/1997 | Boswell ...................... 156/220 | 5,966,205 | A | 10/1999 | Jung et al. |
| 5,671,202 | A | 9/1997 | Brownstein et al. | 5,989,835 | A | 11/1999 | Dunlay et al. |
| 5,671,288 | A | 9/1997 | Wilhelm et al. | 5,998,128 | A | 12/1999 | Roelant |
| 5,673,338 | A | 9/1997 | Denenberg et al. | 6,001,573 | A | 12/1999 | Roelant |
| 5,677,952 | A | 10/1997 | Blakley, III et al. | 6,002,830 | A | 12/1999 | Quan |
| 5,680,383 | A | 10/1997 | Clark et al. | 6,005,960 | A | 12/1999 | Moore |
| 5,681,633 | A | 10/1997 | Onagi et al. | 6,009,065 | A | 12/1999 | Glushko et al. |
| 5,698,397 | A | 12/1997 | Zarling et al. | 6,009,071 | A | 12/1999 | Ahn et al. |
| 5,706,047 | A | 1/1998 | Lentz et al. | 6,011,772 | A | 1/2000 | Rollhaus et al. |
| 5,706,266 | A | 1/1998 | Brownstein et al. | 6,018,374 | A | 1/2000 | Wrobleski |
| 5,710,626 | A | 1/1998 | O'Rourke et al. | 6,027,855 | A | 2/2000 | Sokoluk et al. |
| 5,711,915 | A | 1/1998 | Siegmund et al. | 6,039,898 | A | 3/2000 | Glushko |
| 5,716,825 | A | 2/1998 | Hancock et al. | 6,052,354 | A | 4/2000 | Gudesen et al. |
| 5,719,948 | A | 2/1998 | Liang | 6,052,465 | A | 4/2000 | Gotoh et al. |
| 5,728,350 | A | 3/1998 | Kinoshita et al. | 6,071,671 | A | 6/2000 | Glushko et al. |
| 5,736,342 | A | 4/1998 | Van Wie et al. | 6,094,413 | A | 7/2000 | Guerra |
| 5,740,574 | A | 4/1998 | Piraino | 6,099,930 | A | 8/2000 | Cyr et al. |
| 5,753,511 | A | 5/1998 | Selinfreund | 6,104,561 | A | 8/2000 | Braithwaite et al. |
| 5,760,384 | A | 6/1998 | Itoh et al. | 6,104,686 | A | 8/2000 | Whitcher et al. |
| 5,761,301 | A | 6/1998 | Oshima et al. | 6,115,344 | A | 9/2000 | Gudesen et al. |
| 5,762,873 | A | 6/1998 | Fanning et al. | 6,119,943 | A * | 9/2000 | Christy ...................... 235/468 |
| 5,766,324 | A | 6/1998 | Ikegaya et al. | 6,122,245 | A | 9/2000 | Kondo et al. |
| 5,770,348 | A | 6/1998 | Kondo | 6,122,373 | A | 9/2000 | Gotoh et al. |
| 5,773,808 | A | 6/1998 | Laser | 6,125,181 | A | 9/2000 | Gotoh et al. |
| 5,774,160 | A | 6/1998 | Gundjian | 6,128,388 | A | 10/2000 | Gotoh et al. |
| 5,776,713 | A | 7/1998 | Garner et al. | 6,141,419 | A | 10/2000 | Gotoh et al. |
| 5,784,193 | A | 7/1998 | Ferguson | 6,144,742 | A | 11/2000 | Gotoh et al. |
| 5,786,182 | A | 7/1998 | Catanzariti et al. | 6,157,551 | A | 12/2000 | Barak et al. |
| 5,786,509 | A | 7/1998 | Belding et al. | 6,160,888 | A | 12/2000 | Gotoh et al. |
| 5,790,489 | A | 8/1998 | O'Connor | 6,162,550 | A * | 12/2000 | Pinchen et al. ............. 428/624 |
| 5,800,785 | A | 9/1998 | Bochner | 6,173,109 | B1 | 1/2001 | Quan |
| 5,805,549 | A | 9/1998 | Fite et al. | 6,175,629 | B1 | 1/2001 | Gotoh et al. |
| 5,805,551 | A | 9/1998 | Oshoma et al. | 6,188,659 | B1 | 2/2001 | Mueller et al. |
| 5,807,625 | A | 9/1998 | Amon et al. | 6,192,475 | B1 | 2/2001 | Wallace |
| 5,811,152 | A | 9/1998 | Cleary | 6,196,383 | B1 * | 3/2001 | Pinchen et al. ............. 206/264 |

| | | | |
|---|---|---|---|
| 6,219,329 B1 | 4/2001 | Tanaka et al. | |
| 6,232,124 B1 | 5/2001 | Selinfreund | |
| 6,246,778 B1 | 6/2001 | Moore | |
| 6,373,965 B1 | 4/2002 | Liang | |
| 6,432,715 B1 | 8/2002 | Nelson et al. | |
| 6,490,030 B1 | 12/2002 | Gill et al. | |
| 6,493,014 B1 * | 12/2002 | Aroneo | 347/171 |
| 6,512,580 B1 | 1/2003 | Behringer et al. | |
| 6,589,626 B1 | 7/2003 | Selinfreund et al. | |
| 2002/0001690 A1 | 1/2002 | Selinfreund et al. | |

FOREIGN PATENT DOCUMENTS

| | | |
|---|---|---|
| DE | 196 17 106 A1 | 10/1997 |
| EP | 0 327 163 A2 | 8/1989 |
| EP | 0 460 346 A2 | 12/1991 |
| EP | 0 589 991 B1 | 4/1994 |
| EP | 0 591 315 B1 | 4/1994 |
| EP | 0 736 767 A1 | 10/1996 |
| GB | 1 334 866 | 10/1973 |
| GB | 2 258 528 A | 2/1993 |
| GB | 2 298 713 B | 9/1996 |
| GB | 2 334 574 A | 8/1999 |
| GB | 2 334 574 A | 8/1999 |
| JP | 63184039 | 7/1988 |
| JP | 1-211285 | 8/1989 |
| JP | 4-128834 | 4/1992 |
| JP | 6-204371 | 2/1994 |
| JP | 7056512 A2 | 3/1995 |
| JP | 9-292071 | 11/1997 |
| JP | 11-126425 | 5/1999 |
| WO | WO 92/22814 A1 | 12/1992 |
| WO | WO 92/22815 A1 | 12/1992 |
| WO | WO 95/06249 | 3/1995 |
| WO | WO 95/06249 A1 | 3/1995 |
| WO | WO 97/31332 | 8/1997 |
| WO | WO 97/31332 A1 | 8/1997 |
| WO | WO 98/08180 | 2/1998 |
| WO | WO 98/29238 | 7/1998 |
| WO | WO 99/14055 | 3/1999 |
| WO | WO 99/14055 A1 | 3/1999 |
| WO | WO 99/23649 | 5/1999 |
| WO | WO 99/55055 | 10/1999 |
| WO | WO 99/55055 A1 | 10/1999 |
| WO | WO 00/19430 | 4/2000 |
| WO | WO 03/44783 | 5/2003 |

OTHER PUBLICATIONS

Anslyn et al. "Rapid and Efficient Analysis of Multiple Chemical/Biochemical Agents in Solution Using Sensor Arrays: Toward the Development of an Electronic Tongue," The University of Texas at Austin, undated.

Barrett, "Molecular Fingerprinting of Food Bourne Pathogens," CDD IFT Symposium, Jun. 21-22, 1996.

Biacore Website, "Sensor chips for BIACORE analysis systems", downloaded from webmaster.bia@eu.biacore.com; undated.

Biacore Website, "Principles of BIAtechnology", downloaded from webmaster.bia@eu.bjacore.com, undated.

Biacore Website, "protein binding", downloaded from webmaster.bia@eu.biacore.com, undated.

Biodiscovery website, "Inventing Expression Bioinformatics", undated.

Bock, G., et al., "Photometric Analysis of Antifading Reagents for Immunofluorescence with Laser and Conventional Illumination Sources," Journal of Histochemistry and Cytochemistry, 33: 699-705 (1985).

Cambridge Healthtech Institute Website, downloaded from www.healthtech.com, undated.

Chan, "Interaction of Aminoacridines with DNA," Biochimica et Biophysica Acta, vol. 204, pp. 252-254, Mar. 19, 1970.

Constant et al., ACS Abstract, Issue of Chemical and Engineering News, Aug. 25, 1994.

Coons, "Localization of Antigen in Tissue Cells," The Journal of Experimental Medicine, vol. 91, pp. 1-13, Jan. 1, 1950.

Corning Microarray Technology Website, "CMT-GAPS Coated Slides—FAQ's", downloaded from www.cmt.corning.com/dev/company info/who/techno . . . , Oct. 26, 1999.

Crossley, R. "Synthesis and Properties of a Potential Extracellular Fluorescent Probe," Perkin Transactions 2, vol. 199, No. 7, pp. 1615-1623, Jul. 1994.

Dragoco Report, pp. 12-13, 1990.

Fluorescent Inks, downloaded from http://www.uvp.com/html/inks.html; downloaded Jul. 1999.

Freemantle, M. "Downsizing Chemistry: Chemical Analysis and Synthesis on Microchips Promise a Variety of Potential Benefits," Chemical and Engineering News, vol. 77, No. 8, pp. 27-37, Feb. 22, 1999.

Furomoto, H.W. "Ultraviolet Organic Liquid Lasers," IEEE Journal of Quantum Electronics, vol. 6, No. 5, pp. 262-268, May 1970.

Furneaux, R. "The Formation of Controlled-Porosity Membranes from Anodically-Oxidized Aluminum," Nature, vol. 337, pp. 147-148 Jan. 1989.

Guilbault, G. "General Aspects of Luminescence Spectroscopy" in *Practical Fluoroscence*, 2nd Edition, pp. 27-40, 1990.

Gill, D. "Inhibition of Fading in Fluorescence Microscopy of Fixed Cells," Experientia, vol. 35, No. 3, pp. 400-401, Mar. 15, 1979.

Glabe, Charles G. "Preparation and Properties of Fluorescent Polysaccharides, Analytical Biochemistry," vol. 130, pp. 287-294, 1983.

Huff, J. "Enhancement of Specific Immunofluorescent Findings with Use of a Para-Phenylenediamine Mounting Buffer, The Journal of Investigative Dermatology" vol. 78, No. 5, 449-450, 1982.

Iatridou, H. "The Development of a New Family of Intracellular Calcium Probes," Cell Calcium, pp. 190-198, Feb. 1994.

The Invisible Barcode, downloaded from http://www.canadianpackaging.com/C . . . aging, downloaded Jul. 1999.

Johnson, G. "Fading of Immunofluorescence during Microscopy: a Study of the Phenomenon and its Remedy," Journal of Immunological Methods vol. 55, pp. 231-242, 1982.

Johnson, G. "A Simple Method of Reducing the Fading of Immunofluorescence during Microscopy," Journal of Immunological Methods, vol. 43, pp. 349-350, 1981.

Junior LB 9509, the portable luminometer; downloaded from http://www.berthold.com.au/bioanalyticalpages/LB9509.html. downloaded Oct. 26, 1999.

Larsen, R. "Spectroscopic and Molecular Modeling Studies of Caffeine Complexes with DNA Intercalators," Biophysical Journal, vol. 70, pp. 443-452, Jan. 1996.

Lee, S. "A Fluorometric Assay for DNA Cleavage Reactions Characterized with *Bam*HI Restriction Endonuclease," Analytical Biochemistry vol. 220, pp. 377-383, 1994.

Minta, Akwasi, "Fluorescent Indicators for Cytosolic Calcium Based on Rhodamine and Fluorescein Chromophores," The Journal of Biological Chemistry, vol. 264, No. 14, pp. 8171-8178, 1989.

Packard Website, "The Biochip Arrayer", downloaded from www.packardinst.com/prod_serv/-Biochiparrayer.htm, Oct. 26, 1999.

Packard Instrument Company website disclosure: Tools for Life Science Research, pp. 1-2.

Platt, J. L., et al., "Retardation of Fading and Enhancement of Intensity of Immunofluorescence by p-phenylenediamine," Journal of Histochemistry and Cytochemistry, vol. 31, No. 6, pp. 840-842, Jun. 1983.

Phosphor Technology, downloaded from http:/www.phosphor.demon.co.uk/iruv.htm; downloaded Jul. 1999.

Practical Fluorescence, Second Edition, G.G. Guilbault, Editor, Marcel Dekker, Inc., p. 32, 1990.

Raybourne, "Flow Cytometry in Food Microbiology," IFT Symposium FDA Jun. 21-22, 1996.

Schauer et al., "Cross-reactive optical sensor arrays", ACS Meetings, San Francisco National Meeting, downloaded from http://schedule.acs.org/cgi-bin/ACS/perso . . . , Mar. 7, 2000.

Service, R. "Coming Soon: The Pocket DNA Sequencer," Science, vol. 282, pp. 399-401 Oct. 1998.

Service, R. "Microchip Arrays Put DNA on the Spot," Science, vol. 282, pp. 396-399 Oct. 1998.

Skolnick A. "Russian and U.S. Researchers Develop 'Biochips' for Faster, Inexpensive Biomedical Tests," Journal of the American Medical Association, vol. 275, No. 8, pp. 581-582.

Stanley, "UT scientists engineer a tiny arbiter of taste", Austin American Statesman Newspaper, p. B1, Jul. 26, 1998.

Stringer, J. "Photonics Center Launches Three New Companies" Apr. 1999.

Stryer, L. "Fluorescence Energy Transfer as a Spectroscopic Ruler, Annual Review of Biochemistry," vol. 47, pp. 819-846, 1978.

Tarkka, Richard M., et al., "Holographic storage in a near-ir sensitive photochromic dye," Optics Communications, vol. 109, pp. 54-58, Jun. 15, 1994.

Uchiyama, H. "Detection of Undegraded Oligonucleotides in Vivo by Fluorescence Resonance Energy Transfer," The Journal of Biological Chemistry, vol. 271, No. 1, pp. 380-384, Jan. 5, 1996.

V.L. Engineering, Our Products, downloaded from http://www.vlengineering.com/products/wizard_PV6A, downloaded Jul. 1999.

Wittwer, C. "Continuous Fluorescence Monitoring of Rapid Cycle DNA Amplification," Biotechniques, vol. 22, pp. 130-138, Jan. 1997.

AOAC Official Methods of Analysis, 1990, pp. 752-754.

Biocode Product Literature: IncSure Technologies Biocode p. 23.

Sari, M.A. et al., Biochemistry, 1990, 29, pp. 4205-4215.

Miskelly et al. Inorganic Chemistry 1988, 27, pp. 3773-3781.

Igarashi S. et al. Chemistry Letters, 1984, p. 1871.

Seto, D. et al. Anal. Biochem 189 pp. 51-53 (1990).

Draper, D.E. Biophys. Chem. 21. pp. 91-101 (1985).

Arnold D.P. Australian Journal of Chemistry, 1989, 42 pp. 2265-2274.

International Search report PCT/US02/31378 dated Dec. 16, 2002.

Minta, Akwasi, et al., "Fluorescent Indicators for Cytosolic Calcium Based on Rhodamine and Fluorescein Chromophores," No. 14, pp. 8171-8178 (1989).

Uchiyama, Hisatoshi, et al., "Detection of Undegraded oligonucleotides in Vivo by Fluorescence Resonance Energy Transfer," The Journal of Biological Chemistry, vol. 271, pp. 380-384, Jan. 5, 1996.

Wittwer, Carl T., et al., "Continuous Fluorescence Monitoring of Rapid Cycle DNA Amplification," Biotechniques, vol. 22, pp. 130-138, Jan. 1997.

Service, Robert., "Micorchip Arrays Put DNA on the Spot," Science, vol. 282, pp. 396-399 (Oct. 16, 1998).

Service, Robert. "Coming Soon: The Pocket DNA Sequencer," Science, vol. 282, pp. 399-401 (Oct. 1998).

Amato, Ivan, "Formenting a Revolution, in Miniature," Science, vol. 282, pp. 402-404 (Oct. 16, 1998).

Stanley, Dick, "UT scientists engineer a tiny arbiter of taste," Austin American Statesman Newspaper, p. B1, Jul. 26, 1998.

Coons, "Localization of Antigen In Tissue Cells, " The Journal of Experimental Medicine, vol. 91, pp. 1-13, Jan. 1, 1950.

V.L. Engineering, Our Products, downloaded form http://www.vlengineering.com/products/wizard PV6A, downloaded Jul. 1999.

Corning Microarray Technology Website, "CMT-GAPS Coated Slides-FAQ's," downloaded from 222.cmt.corning.com/dev/company—info/who/techno...., Oct. 26, 1999.

Anslyn, et al., "Rapid an Efficient Analysis of Multiple Chemical/Biochemical Agents in Solution Using Sensor Arrays: Toward the Development of an Electronic Tongue," The University of Texas at Austin, 1998.

Packard website, "The Biochip arrayer," downloaded from www.packardinst.com/prod serv/-Biochiparrayer.htm. Oct. 26,1999.

\* cited by examiner

PRODUCT PACKAGING INCLUDING DIGITAL DATA

RELATED APPLICATIONS

This application is a continuation-in-part application of, and claims priority to, U.S. patent application Ser. No. 09/608,886, filed Jun. 30, 2000. This application also claims the benefit under 35 U.S.C. § 119(e) of U.S. Provisional Application No. 60/326,706, filed Oct. 2, 2001. The disclosures of such applications are hereby incorporated by reference.

BACKGROUND OF THE INVENTION

1. Field of the Invention

This invention generally relates to systems for authenticating articles, methods for authenticating articles, and processes for marking articles for later authentication. The present invention more particularly relates to the use of light sensitive materials in shipping materials, including security seals and tear tape, for authentication, discrimination and recognition of items.

2. Description of the Related Art

Product diversion and counterfeiting of goods is a major problem. Counterfeiting entails the manufacture of a product that is intended to deceive another as to the true source of the product. Product diversion occurs when a person acquires genuine, non-counterfeit goods that are targeted for one market and sells them in a different market. A diverter typically benefits by selling a product in a limited supply market designed by the product's manufacturer. There may be high pecuniary advantages to counterfeiting and diverting genuine goods. Such monetary gains motivate charlatans to invest large sums of money and resources to defeat anti-counterfeiting and diversion methods.

Numerous methods have been proposed in the art to prevent counterfeiting and diversion of products. Typically such methods employ a step of marking the product with a substance not readily observable in visible light. In one type of anti-counterfeit and anti-diversion measure, an ultraviolet (UV) material is used to mark the product with an identifying indicia. Most UV materials are typically not visible when illuminated with light in the visible spectrum (380–770 nm), but are visible when illuminated with light in the UV spectrum (200–380 nm). U.S. Pat. No. 5,569,317 discloses several UV materials that can be used to mark products that become visible when illuminated with UV light having a wavelength of 254 nm.

In another type of anti-counterfeit and anti-diversion measure, an infrared (IR) material is used to mark the product. As with the UV ink, one benefit of using the IR materials is that it is typically not visible when illuminated with light in the visible spectrum. IR materials are visible when illuminated with light in the IR spectrum (800–1600 nm). An additional benefit of using an IR material is that it is more difficult to reproduce or procure the matching IR material by studying a product sample containing the IR security mark. Examples of IR security mark usage are given in U.S. Pat. No. 5,611,958 and U.S. Pat. No. 5,766,324.

Security may be improved by making authentication marks more difficult to detect and interpret, by incorporating greater complexity into the markings, and by making replication of the mark by a counterfeiter more difficult. Combining multiple kinds of marking indicia can further increase the complexity of detection, interpretation and replication.

For example, the use of security marks containing IR and UV materials has seen increased use. However, as this use has increased, counterfeiters have become correspondingly knowledgeable about their application on products. It is common practice for counterfeiters to examine products for UV and IR marks and to reproduce or procure the same materials, and apply the materials on the counterfeit products in the same position. In U.S. Pat. No. 5,360,628 and U.S. Pat. No. 5,599,578, the disclosures of both of which are incorporated by reference herein, a security mark comprising a visible component and an invisible component made up of a combination of a UV dye and a biologic marker, or a combination of an IR dye and a biologic marker is proposed.

The use of fluorescent and phosphorescent materials have also been proposed for marking materials. U.S. Pat. No. 5,698,397 discloses a security mark containing two different types of up-converting phosphors. U.S. Pat. No. 4,146,792 to Stenzel et al. discloses authentication methods that may include use of fluorescing rare-earth elements in marking the goods. Other authentication methods use substances which fluoresce in the infrared portion of the electromagnetic spectrum when illuminated in the visible spectrum range (See, e.g., U.S. Pat. No. 6,373,965).

Non-chemical methods for authenticating items and preventing diversion of items are also known. For example, U.S. Pat. No. 6,162,550 discloses a method for detecting the presence of articles comprising applying a tagging material in the form of a pressure sensitive tape having a first surface coated with pressure sensitive adhesive composition and a second surface opposite the first surface coated with a release agent, the tape including a continuous substrate of synthetic plastics material and a continuous electromagnetic sensor material capable of being detected by detection equipment. The tagging material can be detected by an interrogation field directed to determining magnetic changes.

Authentication marks comprising tagging material are typically applied to the article of commerce itself. However, authentication marks on the article of commerce are not useful when the article is covered by packaging material and a quick determination of counterfeiting or diversion is desired to be made. It is known, therefore, in the art to also provide tags on the packaging of a product (See, e.g., U.S. Pat. No. 6,162,550).

Authentication marks may be applied by any of the methods currently used in manufacturing and distribution plants to code product for identification, to date code product for freshness, to produce batch markings which allow product to be traced, to sequentially number products such as newspapers caring lottery-style games, and to code product, such as mail, for ultimate destination. A leader in such coding technology is Domino Printing Sciences PLC (Bar Hill Cambridge CB3 8TU UK). Predominant methods for coding include: continuous ink jet printing, binary printing and laser printing.

Continuous ink jet printing is a non-contact method of printing variable information that works by spraying an ink onto a surface as it travels underneath a printhead. Ink in the print head is typically supplied under pressure to a drop generator which contains a drive rod which creates ultrasonic pressure waves in the ink, making the jet break up into a stream of separate drops shortly after it exits through a small nozzle. Each drop is given an electrostatic charge by putting a voltage onto a charge electrode as the drop breaks off. As the drop drops it conventionally passes through an electrostatic field set up between two high voltage deflector plates.

Binary printing is similar to that of ink jet printing in that tiny drops of ink are deflected in flight by an electrostatic field. It differs, however, from ink jet printing in the use of the voltage on the print drop and the subsequent deflection of that drop. The ink drops that are not used for printing are charged and are deflected into the gutter. The uncharged drops which are not deflected by the high voltage field are used to print on the substrate. Because uncharged drops are used for printing optimum print quality and speed can be achieved.

Laser printing typically involves either vaporization of the surface material at which it is directed (e.g., removal of ink from paper), distinct surface changes (e.g., deformations in glass and PET), or thermal decomposition causing a material in the product to change color. Lasers produce coherent, monochromatic radiation that is capable of delivering large amounts of energy in a small area. Most conventional lasers work by exciting gas with RF energy, the gas being contained in a sealed tube mounted with mirrors at each end. When the gas molecules are excited sufficiently, a photon is spontaneously emitted. The photon is amplified as it stimulates more photon emissions while it moves along the tube. The photons bounce along the tube between one mirror which is fully reflective and the other which is partially transmissive. When a critical mass is reached, a pulse of heat radiation is emitted to the form of a laser beam which is focused via lenses to produce precise marking energy.

Security and anti-counterfeit coding on relatively expensive items, in particular luxury perfume, cosmetics, tobacco products, and pharmaceutical products, is known. Such coding is useful for the traceability of products and identification of the same.

However, such coding is typically not unique to the particular item within the general product class. The latter is probably largely due to the slow speed at which a production line would have to operate to mark in a unique fashion each item, in particular given the current technologies for marking. As such coding is typically not unique to the item, and as experience has shown that generic invisible marks are often detected by counterfeiters and diverters and are easily duplicated on other items within the general product class, there is a great need for an improved method of identifying goods that are either counterfeit or diverted.

DEFINITIONS

"Authentication Material" refers to a material used to authenticate, identify or protect an optical medium. The data recorded on an optical medium, for example, software, video or audio files, are not authentication material.

"Light-Changeable Material": a material that absorbs, reflects, emits or otherwise alters electromagnetic radiation directed at the same. By "light-changeable compound" it is meant to include, without limitation, "light-sensitive", "light-emissive" and "light-absorbing" compounds, as defined below.

"Light-Absorbing Materials": materials that absorb light in response to irradiation with light. Light absorption can be the result of any chemical reaction known to those of skill in the art.

"Light-Emissive material": a material that emits light in response to excitation with light. Light emission can be a result of phosphorescence, chemiluminescence, or fluorescence. By the term "light-emissive compounds," it is meant to include compounds that have one or more of the following properties: 1) they are a fluorescent, phosphorescent, or luminescent; 2) react, or interact, with components of the sample or the standard or both to yield at least one fluorescent, phosphorescent, or luminescent compound; or 3) react, or interact, with at least one fluorescent, phosphorescent, or luminescent compound to alter emission at the emission wavelength.

"Light-Sensitive Material": a material capable of being activated so as to change in a physically measurable manner, upon exposure to one or more wavelengths of light.

"Optical State Change Security Material": refers to an inorganic or organic that changes optical state from a first optical state to a second optical state upon exposure to a defined wavelength of light.

"Recording Dye" refers to a chemical compound that may be used with an optical recording medium to record digital data on the recording layer.

"Re-read": reading a portion of data after it has been initially read.

"Reversible Light-Sensitive Material": a light-sensitive material is said to be reversible when the activated change returns to the initial state due to the passage of time or change in ambient condition.

"Temporary Material": refers to a material that is detectable for a limited amount of time or a limited number of readings.

"Transient Optical State Change Security Material": refers to an Optical State Change Security material that transiently changes optical state between a first optical state and a second optical state, and the second optical state spontaneously reverting back to said first optical state after a period of time.

For the purpose of the rest of the disclosure it is understood that the terms as defined above are intended whether such terms are in all initial cap, or not.

SUMMARY OF THE INVENTION

The present invention provides for systems for authenticating articles, methods for authenticating articles, and processes for marking articles for later authentication. The present invention more particularly relates to the use of light sensitive materials in shipping materials, including security seals and tear tape, for authentication, discrimination and recognition of items.

Currently digital content can be written onto many types of optical media. For example, write once read many time optical discs (WORM). Write-able optical media allows a large amount of data to be digitized onto a very small space. Contents of movies, sound tracks, recordings, software and video games can be compressed onto optical media for play back with high fidelity in real time. Today, it is possible for recording lasers to make simple laser based digital copies of binary information onto dye based clear recording media.

Many writeable optical media that are available today employ light-sensitive materials, in particular light-sensitive recording dyes that are sensitive to a laser write beam. Light-sensitive materials used in presently available write-able optical media typically change in optical state when exposed to the laser write beam in a manner that can be detected by a optical reader of the media. Digital data is therefore represented by optical deformations on the optical media formed by activation of the light-sensitive materials with the laser write beam. Light-sensitive materials employed on writeable optical media change optical state quickly upon exposure to the laser write beam, and are generally stable under conditions in which optical media are typically used and stored.

Recognizing the problems associated with applying unique identifiers to products in production lines, the present inventors have proposed using many of the light-sensitive materials used in writeable optical media, in particular light-sensitive recording dyes, on/in non-optical media products, or the packaging materials surrounding such products, to permit the rapid writing of unique identification information with respect to each item in a product class. The present inventors propose that such materials may be used to significantly enhance "generic" authentication techniques.

Security may be further enhanced by incorporating transient optical state change materials onto/into the packaging. Such transient optical state change materials may or may not be light emissive compounds. Such materials may be placed in specific locations with respect to the packaging material, and preferably are positioned so as to represent digital data that may be authenticated by software means. Transient optical state change security materials, and in particular transient optical state change recording dyes, are particularly useful in authentication/anti-diversion in that not only the presence of the optical state change is indicative of whether the item is authenticate, but also the time necessary for the optical state to revert to the un-activated state.

In an advantageous embodiment, there is disclosed light-sensitive materials incorporated into tear tape associated with a product. As would be understood by one of ordinary skill in the art, a tear tape is a continuous tape provided of base materials in which a pressure sensitive adhesive can be added to in one mode and an additional mode a safety device (such as a rare earth material as in the case of technology disclosed by PP Payne LTD) or a hologram (as explained in JP7056512A2) can be added. The tear tape can help a consumer open a package, it may provide safety information, a serial number, production location date and potentially other security features, as mentioned. A tear tape is adhered to the surface of packaging material in a manner such that, in use, an end of the tear tape, can be pulled so as to tear the packaging material underlying the tear tape to allow access to the contents. Tear tapes are effective in opening various types of consumer packaging, especially those formed from packaging material using non-hermetic wrapping techniques such as roll wrapping and standard envelope wrapping.

The tear tape embodiment incorporates light-sensitive material that acts like such materials when placed in optical medium, that is allowing data to be written thereon using a laser as the materials can be rapidly altered by the writing beam, information unique to a product can be incorporated onto the tear tape very rapidly. As the tape can be fed from a bulk supply in a manner such that the tape is uniformly positioned from the writer laser (without the need for the laser to change position owing to the dimensions of the package to be coded), and can be uniformly passed by the writer laser, extremely fast package coding is effectuated as unseen in the prior art.

One aspect of an embodiment of the present invention involves a tape having a first longitudinal surface and a second longitudinal surface. A light-sensitive material is formed on the second longitudinal surface followed by a layer of pressure-sensitive adhesive on the light-sensitive material. A release agent is formed on the first longitudinal surface. Another aspect of an embodiment comprises a band of material having a first longitudinal surface and a second longitudinal surface, either or both of the longitudinal surfaces being coated with layer of light-sensitive material.

Another embodiment of the present invention provides a method for verifying an authentication mark comprising a transient optical state change security material. The method involves illuminating the authentication mark with a wavelength causing the transient optical state change security material to change optical state from a first optical state to a second optical state. The method provides for determining the time it takes for reversion of the transient optical state change security material from said second optical state to said first optical state. The method also involves comparing the time taken for reversion with a reference time for optical state change to verify the authentication mark.

Yet another embodiment of the present invention involves a method for providing an authenticity mark on an item. The method involves the steps of: incorporating onto the packaging of a product a light-sensitive security material activated by a defined wavelength of light and exposing said light-sensitive security material to the defined wavelength of light in a manner so as to form changes in the light-sensitive security material decipherable as digital data. Another aspect of an embodiment provides a method for authenticating an item associated with a packaging. The packaging has digital data recorded thereon in the form of activated light-sensitive security material. The method comprises the steps of: scanning the package with an optical reader to decipher the digital data represented by the activated light-sensitive security material on said packaging; authenticating the item if the digital data of step (a) matches a standard of digital data that should be on a genuine item.

A further aspect of an embodiment of the present invention involves a method of providing an authenticity mark on an item having incorporated thereon digital information in discernible optically recorded forms. The method comprises the step of: overlaying a transient optical state change security material capable of existing in a first optical state and a second optical state over said optically recorded forms. Still another aspect of an embodiment provides a method for authenticating an authenticity mark on an item comprising a transient optical state change security material overlaid on optically recorded forms of digital information. The method comprises the steps of: reading the digital information when the transient optical state change security material is in the first optical state and the second optical state; comparing the digital information read in the first optical state and the second optical state with a reference read of said digital information on an authentic item in both of the first and the second optical state.

DETAILED DESCRIPTION

Figure 1:
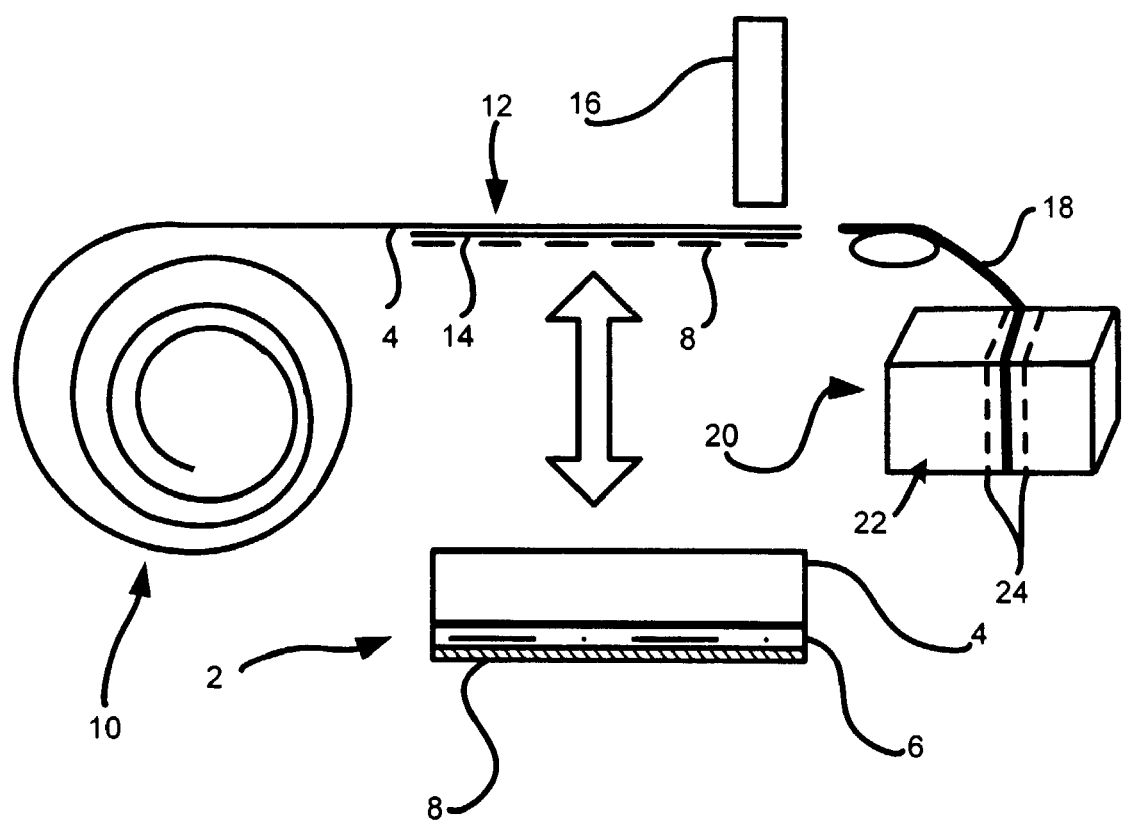
FIG. 1 is a schematic of a method to incorporate digital data onto tear tape and its application to mark packages.

The present invention discloses placing light-sensitive material on product or packaging medium (e.g., the tear tape) in order to provide, for example, identification, verification, an access code or additional data.

In one embodiment, the light-sensitive material is applied to the packaging medium and provided desired information, as explained in connection with the application of the light sensitive material to other media in co-pending U.S. patent application Ser. Nos. 09/232,324, 09/608,886, 09/631,585, 09/821,577, 09/739,090, each of which is hereby incorporated by reference.

The light-sensitive compound may be deposited in or on the packaging medium, such as cases, cartons, wrappers, labels, shipping cartons, etc., in order to identify the product and/or package or supply information about it. A number of different materials having different characteristics may be used on the packaging medium to provide a more sophisticated coding technique.

As shown in FIG. 1, in one embodiment, a base material 4 from bulk supply 10 is coated with a light-sensitive material layer 14, advantageously a transient optical state change recording dye, which is over-coated with an adhesive layer 8 to make a tear tape 12 having light-sensitive material therein. Tear-tape 12, comprising base layer 4, adhesive layer 8, is exposed to laser writer 16 to incorporate digital data into the light-sensitive material layer 14 forming coded layer 6. The digital data tear-tape 12 is then applied to the package 20 of a packaged item 22, for example at a position on the package such as nearby perforations 24, such as to provide easy opening of package 20. Alternatively, as would be understood by one of ordinary skill in the art, digital content can be coded into the packaging materials by selectively imprinting/imbuing the tear tape with the light sensitive material. The tear-tape embodiment would allow a producer to code each package with a unique code for each package, while demonstrating to the customer package integrity. At the same time, the light-sensitive material technology could include digital content light-sensitive material with a transient phase change that allows for security features, including time dependent features, to be built into the digital content layer(s), as described in more detail below.

It is preferred that the light-sensitive material employed be a light-changeable material that is sensitive to the wavelength of the writer light source that is to be employed. Preferably the material is an optical state change security material. Given the difficulty in reproducing its effect, a more preferred embodiment comprises a transient optical state change security material. When such materials are employed, authenticity may be adjudged not only by detection of an optical state change at selectively pre-determined locations, but also by assuring that any state change detected is capable of occurring within pre-determined time frames characteristic for the transient optical state change security material that is supposed to be on the authenticate product.

Currently, packaging lines purchase bobbins of pressure sensitive tear tape. The tear tape could contain holograms or generic security features that are not changeable for each package. In one embodiment, the pressure sensitive tear tape has the same dye used in optical media recordings (see, U.S. patent application Ser. Nos. 09/608,886, 09/631,585, ) mixed into the adhesive layer before being placed onto the bobbin. As the bobbin unwinds at the packaging plant, a read laser places package specific code unique to each package as the package is being wrapped. This allows for the complete track and trace of each package, such as a cigarette package. Today, cigarette lines have pressure sensitive tear tape that have security features, but individual laser codes must be applied by a separate laser coded later in the production line. Additionally, these codes are easy to copy with nearly any laser coder on the market able to copy the codes. Therefore, the current laser codes are only able to provide tracking information in a secure environment.

Examples of suitable dyes for application to package media will now be described. However, other suitable dyes as would be understood by one of ordinary skill in the art may also be employed as the present invention is not limited in this respect.

Dye DOTC Iodide (Exciton) could be mixed with spray adhesive (0.037%–124% w/v) onto pressure sensitive tear tape materials. Tear tape is further split by knife cutters and placed onto a spool. A read/write laser (CDR) is placed against the dye side and digital content is written onto the blank tape as the spool is unwound and before the tear tape is wrapped around the package. The digital content length is from 0.6 µM to several centimeters in length, depending on the size of the digital content being recorded. A tear tape may be of any length, for example 15 cm. The compression of the digital content allows for the entire code to be visible across the front of the package without alignment or registration of the code. The code is then read using a digital reader (bar code scanner). In another embodiment the reader could be a digital reader such as the one available in DVD/CD reader.

A wide variety of light sensitive compounds may be used with the present invention including any compounds that emit or are excited by light having a wavelength of about 300–1100 nm. Groups from which the light sensitive compounds may be chosen include, but are not limited to, inorganic pigments, organic dyes, photochromic dyes, photochromic dyes cross linked with various polymers, photochromic dyes encapsulated in polymers and thermally stable near infrared fluorophoric compounds copolymerized with an ester linkage.

For example, inks of the present invention may be water dissipatable polyesters and amides such as the dyes disclosed in U.S. Pat. Nos: 5,292,855, 5,336,714, 5,614,008 and 5,665,151, each of which is hereby incorporated by reference herein.

It is preferred that the near infrared fluorescent compounds are selected from the phthalocyanines, the naphthalocyanines and the squarines (derivatives of squaric acid) that correspond respectively to the structures shown in FIGS. 1, 2 and 3 of U.S. Pat. No. 6,432,715, which is hereby incorporated by reference. In these structures, Pc and Nc represent the phthalocyanines and naphthalocyanine moieties, covalently bonded to hydrogen or to the various metals, halometals, organometallic groups and oxymetals disclosed therein. It is preferred that the structures include at least one polyester reactive group to allow the compound to be incorporated into a polymeric composition and to be bound by covalent bonds.

The ink of the invention may also include photochromic dyes such as photochromic dye incorporated into a polymeric composition and photochromic dyes encapsulated to form microcapsules such as described in U.S. Pat. No. 5,807,625, hereby incorporated by reference herein. Preferably, these photochromic dyes are from four classes:

(i) spiro-indolino-naphthoxazines.
(ii) fulgides which are derivatives of bis-methylene succinic anhydride
(iii) fulgimides which are derivatives of bis-methylene succinic imide where the imide nitrogen may be substituted by alkyl, aryl or aralkyl; and
(iv) spiro(1,8a)-dihydroindolizines.

The light-sensitive materials of the present invention may also include microbead labeled with organic/inorganic dye such as described in U.S. Pat. No. 5,450,190, hereby incorporated by reference herein.

Also useful as light sensitive materials with the present invention are the dyes or dye combinations described in U.S. Pat. No. 5,286,286, hereby incorporated by reference herein. These may include:

5,10,15,20-tetrakis-(1-methyl-4-pyridyl)-21H,23H-porphine tetra-p-tosylate salt;

5,10,15,20-tetrakis-(1-methyl-4-pyridyl)-21H,23H-porphine tetrachloride salt;
5,10,15,20-tetrakis-(1-methyl-4-pyridyl)-21H,23H-porphine tetrabromide salt;
5,10,15,20-tetrakis-(1-methyl-4-pyridyl)-21H,23H-porphine tetra-acetate salt;
5,10,15,20-tetrakis-(1-methyl-4-pyridyl)-21H,23H-porphine tetra-perchlorate salt;
5,10,15,20-tetrakis-(1-methyl-4-pyridyl)-21H,23H-porphine tetrafluoroborate salt;
5,10,15,20-tetrakis-(1-methyl-4-pyridyl)-21H,23H-porphine tetra-perchlorate salt;
5,10,15,20-tetrakis-(1-methyl-4-pyridyl)-21H,23H-porphine tetrafluoroborate salt;
5,10,15,20-tetrakis-(1-methyl-4-pyridyl)-21H,23H-porphine tetra-perchlorate salt;
5,10,15,20-tetrakis-(1-methyl-4-pyridyl)-21H,23H-porphine tetra-triflate salt;
5,10,15,20-tetrakis-(1-hydroxymethyl-4-pyridyl)-21H,23H-porphine tetra-p-tosylate salt;
5,10,15,20-tetrakis-[1-(2-hydroxyethyl)-4-pyridyl]-21H,23H-porphine tetrachloride salt;
5,10,15,20-tetrakis-[1-(3-hydroxypropyl)-4-pyridyl]-21H,23H-porphine tetra-p-tosylate salt;
5,10,15,20-tetrakis-[1-(2-hydroxypropyl)-4-pyridyl]-21H,23H-porphine tetra-p-tosylate salt;
5,10,15,20-tetrakis-[1-(-hydroxyethoxyethyl)-4-pyridyl]-21H,23H-porphine tetra-p-tosylate salt;
5,10,15,20-tetrakis-[1(2-hydroxyethoxypropyl)-4-pyridyl]-21H,23H-porphine tetra-p-tosylate salt;
5,10,15,20-tetrakis-[4-(trimethylammonio)phenyl]-21H,23H-porphine tetra-p-tosylate salt;
5,10,15,20-tetrakis-[4-(trimethylammonio)phenyl]-21H,23H-porphine tetrachloride salt;
5,10,15,20-tetrakis-[4-(trimethylammonio)phenyl]-21H,23H-porphine tetrabromide salt;
5,10,15,20-tetrakis-[4-(trimethylammonio)phenyl]-21H,23H-porphine tetra-acetate salt;
5,10,15,20-tetrakis-[4-(trimethylammonio)phenyl]-21H,23H-porphine tetra-perchlorate salt;
5,10,15,20-tetrakis-[4-(trimethylammonio)phenyl]-21H,23H-porphine tetrafluoroborate-salt;
5,10,15,20-tetrakis-[4-(trimethylammonio)phenyl]-21H,23H-porphine tetra-triflate salt;
meso-(N-methyl-X-pyridinium)$_n$(phenyl)4-n -21H,23H-porphine tetra-p-tosylate salt, where n is an integer of value 0, 1, 2, or 3, and where X=4-(para),3-(meta), or 2-(ortho) and refers to the position of the nitrogen in the pyridinium substituent, prepared as described, for example, by M. A. Sari et al. in Biochemistry, 1990, 29, 4205 to 4215;
meso-tetrakis-[o-(N-methylnicotinamido)phenyl]-21H,23H-porphine tetra-methyl sulfonate salt, prepared as described, for example, by G. M. Miskelly et al. in Inorganic Chemistry, 1988, 27, 3773 to 3781;
5,10,15,20-tetrakis-(2-sulfonatoethyl-4-pyridyl)-21H,23H-porphine chloride salt, prepared as described by S. Igarashi and T. Yotsuyanagi in Chemistry Letters, 1984, 1871;
5,10,15,20-tetrakis-(carboxymethyl-4-pyridyl)-21H,23H-porphine chloride salt
5,10,15,20-tetrakis-(carboxyethyl-4-pyridyl)-21H,23H-porphine chloride salt
5,10,15,20-tetrakis-(carboxyethyl-4-pyridyl)-21H,23H-porphine bromide salt
5,10,15,20-tetrakis-(carboxylate-4-pyridyl)-21H,23H-porphine bromide salt, prepared as described by D. P. Arnold in Australian Journal of Chemistry, 1989, 42, 2265 to 2274;
2,3,7,8,12,13,17,18-octa-(2-hydroxyethyl)-21H-23H-porphine;
2,3,7,8,12,13,17,18-octa-(2-hydroxyethoxyethyl)-21H-23H-porphine;
2,3,7,8,12,13,17,18-octa(2-aminoethyl)-21H-23H-porphine;
2,3,7,8,12,13,17,18-octa-(2-hydroxyethoxypropyl)-21H-23H-porphine, and the like, as well as mixtures thereof.

Also suitable for use with the present invention are dansyl dyes, including:

| | | |
|---|---|---|
| dansyl-L-alanine | dansyl-L-isoleucine | N-dansyl-L-tryptophan |
| dansyl-L-γ-amino-n-butyric acid | dansyl-L-leucine | O-di-Dansyl-L-tyrosine monocyclohexyl-ammonium salt |
| a-dansyl-L-arginine | di-dansyl-L-lysine | dansyl-L-valine |
| dansyl-L-asparagine | N-ε-dansyl-L-lysine | dansyl-γ-amino-n-butyric acid |
| dansyl-L-aspartic acid | dansyl-L-methionine | dansyl-DL-a-amino-n-butyric acid |
| dansyl-L-cysteic acid | dansyl-L-norvaline | dansyl-DL-aspartic acid |
| N,N'-di-dansyl-L-cystine | dansyl-L-phenylalanine | dansyl-DL-glutamic acid |
| dansyl-L-glutamic acid | dansyl-L-proline | Dansylglycine |
| dansyl-L-glutamine | N-dansyl-L-serine | dansyl-DL-leucine |
| N-dansyl-trans-4-hydroxy-L-proline | N-dansyl-L-threonine | dansyl-DL-methionine |
| dansyl-DL-norleucine | dansyl-DL-a-aminocaprylic acid cyclohexylamine salt | Didansylcadaverine |
| dansyl-DL-norvaline | (dansylaminoethyl) trimethylammonium perchlorate | monodansylcadaverine |
| dansyl-DL-phenylalanine | N-dansyl-DL-serine | Dansylputrescine |
| dansylsarcosine | N-dansyl-DL-threonine | Dansylspermidine |
| N-a-dansyl-DL-tryptophan | dansyl-DL-valine | didansyl-1,4-diaminobutane |
| didansylhistamine | didansyl-1,3-diaminopropane | | all available from Sigma Chemical Corp., St. Louis, Mo., and the like, as well as mixtures thereof.

Additional suitable light-sensitive materials include any dye or dye combination from rare earth metal chelates sold as LUMILUX C pigments by Hoechst-Celanese Corp. in Reidel de-Haen, Germany or those disclosed in U.S. Pat. No. 5,837,042, hereby incorporated by reference herein, or LUMILUX Red CD 331, Red CD 332, Red CD 335, Red CD 316, Red CD 339, Red CD 105, Red CD 106, Red CD 120 and Red CD 131.

Additional light sensitive compounds may also include an organic/inorganic pigment as described in U.S. Pat. No. 5,367,005, hereby incorporated by reference herein, or any dye or dye combination of phenoxazine derivatives as described in U.S. Pat. No. 4,540,595, hereby incorporated by reference herein. The general chemical formula of the phenoxazine dyes is shown in FIG. 6 in which $R_1$ and $R_2$ are alkyl groups and X is an anion.

Additional light sensitive compounds of the present invention may be classified in one of the following four groups depending upon excitation and emission regions, as described in U.S. Pat. No. 4,598,205, hereby incorporated by reference.

(a) Excitation UV-Emission UV
(b) Excitation UV-Emission IR
(c) Excitation IR-Emission UV
(d) Excitation IR-Emission IR Also useful with the present invention is any dye or dye combination of organic infrared fluorescing dye that is soluble in the ink vehicle disclosed in U.S. Pat. No. 5,093,147, hereby incorporated by reference. Such light sensitive compounds include:

| CAS Registry No. | | |
|---|---|---|
| 3071-70-3 | DTTCI | (3,3'-Diethylthiatricarbocyanine Iodide) |
| | DNTTCI | (3,3'-Diethyl-9,11-neopentylenethiatricarbocyanine Iodide) |
| 23178-67-8 | HDITCI | (1,1',3,3,3',3'-Hexamethyl-4,4',5,5'-dibenzo-2,2'-indotricarbocyanine Iodide) (Hexadibenzocyanine 3) |
| 3599-32-4 | IR-125 | 1H-Benz[e]indolium, 2-[7-[1,3-dihydro-1,1-dimethyl-3-(4-sulfobutyl)-2H-benz[e]indol-2-ylidene]-1,3,5-hepatrienyl]-1,1-dimethyl-3-(4-sulfobutyl-, sodium salt |
| | DDTTCI | (3,3'-Diethyl-4,4',5,5'-dibenzothiatricarbocyanine Iodide) (Hexadibenzocyanine 45) |
| 53655-17-7 | IR-140 | Benzothiazolium, 5-chloro-2[2-[3-[5-chloro-3-ethyl-2(3H)-benzothiazolylidene-ethylidene]-2-(diphenylamino)-1-cyclopenten-1-yl]ethyl]-3-ethyl-, perchlorate |
| | DDCI-4 | (1,1'-Diethyl-4,4'-dicarbocyanine Iodide) |
| 62669-62-9 | IR-132 | Naphtho[2,3-d]thiazolium, 2-[2-[2-(diphenylamino)-3-[[3-(4-methoxy-4-oxobutyl)naptho[d]thiazol-2(3H)-ylidene-ethylidene]-1-cyclopenten-1-yl]ethenyl]3-(4-methoxy-oxobutyl)-, perchlorate |

The following light sensitive compounds may also be useful with the present invention:

Sulfuric acid disodium salt mixture with 7-(diethylamino)-4 methyl-2H-1-benzopyran-2-one 3',6'-bis(diethylamino)-spiro-(isobenzofuran-1(3H),9'-(9H)xanthen-3-one or 3',6'-bis(diethyl-amino)-fluoran 4-amino-N-2,4-xylyl-naphthalimide 7-(diethylamino)-4-methyl-coumarin 14H anthra[2,1,9-mna]thioxanthen-14-one N-butyl-4-(butylamino)-naphthalimide In addition, the following compounds may also be used as light sensitive compounds in the present invention:

5-(2-Carbohydrizinomethyl-thioacetyl)-aminofluorescein
5-(4,6-dichlorotriazinyl)-aminofluorescein
Fluor-3-pentammonium salt
3,6-diaminoacridine hemisulfate, proflavine hemisulfate
Tetra(tetramethylammonium salt
Acridine orange
BTC-5N
Fluoresceinamine Isomer I
Fluoresceinamine Isomer II
Sulfite blue
Coumarin diacid cryptand[2,2,2]
Eosin Y
5-(and-6)-carboxy-2',7'-dichloro-fluorescein
5-(and-6)-carboxy-4',5'-dimethyl-fluorescein
5-(and-6)-carboxy-2',7'-dichloro-fluorescein diacetate
Eosin-5-maleimide
Eosin-5-Iodoacetamide
Eosin Isothiocyanate
5-Carboxy-2',4',5',7'tetrabromosulfonefluorescein
Eosin thiosemicarbazide
Eosin Isothiocyanate Dextran 70S
5-((((2-aminoethyl)thio)acetyl)amino) fluorescein
Lucifer yellow CH Potassium salt
Fluorescein isothiocyanate (Isomer I)
Fluorescein isothiocyanate (Isomer II)
Fura-Red, AM
Fluo-3 AM
Mito Tracker Green FM
Rhodamine
5-carboxyfluorescein
Dextran Fluroscein
Merocyanine 540
Bis-(1,3-diethylthiobarbituric acid trimethine oxonol
Fluorescent brightner 28
Fluorescein sodium salt
Pyrromethene 556
Pyrromethene 567
Pyrromethene 580
Pyrromethene 597
Pyrromethene 650
Pyrromethene 546
BODIPY 500/515
Nile Red
Cholesteryl BODIPY FL C12
B-BODIPY FL C12-HPC
BODIPY Type D-3835
BODIPY 500/510 C5-HPC
IR-27 Aldrich 40,610-4
IR-140 Aldrich 26,093-2
IR-768 perchlorate Aldrich 42, 745-4
IR-780 Iodide Aldrich 42,531-1
IR-780 perchlorate Aldrich 42-530-3
IR-786 Iodide Aldrich 42,413-7
IR-786 perchlorate Aldrich 40,711-9
IR-792 perchlorate Aldrich 42,598-2
5-(and-6)-carboxyfluorescein diacetate
6-caroxyfluorescein Sigma
Fluorescein diacetate
5-carboxyfluorescein diacetate
Fluorescein dilaurate
Fluorescein Di-b-D Galactopyranoside
FluoresceinDi-p-Guanidinobenzoate
Indo I-AM
6-caroxyfluorescein Diacetate
Fluorescein thiosemicarbazide
Fluorescein mercuric acetate
Alcian Blue
Bismarck Brown R
Copper Phthalocyanine
Cresyl Violet Acetate
Indocyanine Green
Methylene Blue
Methyl Green, Zinc chloride salt Sigma
Oil Red 0
Phenol Red Sigma
Rosolic Acid
Procion Brilliant Red
Ponta Chrome Violet SW
Janus Green Sigma
Toluidine Blue Sigma
Orange G
Opaque Red
Mercuric Oxide Yellow
Basic Fuchsin
Flazo Orange
Procion Brilliant Orange
5-((5-aminopentyl)thioureidyl)-fluorescein
6-carboxyfluorescein succinimidyl ester
5,5'-dithiobis-(2 nitrobenzoic acid)
5-(and-6)-carboxyfluorescein succinimidyl ester
Fluorescein-5-EX, succinimidyl ester
5-(and-6-)-carboxy SNARF-1
Fura Red, Tetrapotassium salt
Dextran fluorescien, MW 70000
5-(and-6-)-carboxynaphthafluorescein mixed isomers
Rhodol green, carboxylic acid succinimdyl ester
5-(and-6-)-carboxynaphthafluorescein SE mixed isomers
5-carboxyfluorescein, SE single isomer
5-(and-6)-carboxy-2',7'-dichloro-fluorescein diacetate, SE
5-(and-6)-carboxy-SNAFL-1, SE
6-tetramethylrhodamine-5-and-6-carboxamido hexanoic acid, SE
Styryl Dye (4-Di-1-ASP)
Erythrosin-5-isothiocyanate
Newport green, dipotassium salt
Phen green dipotassium salt
Bis-(1,3-dibutylbarbituric acid) trimethine oxonol
Lucigenin(bis-N-methyl acridinium nitrate
Tetrakis-(4-sulfophenyl)-porphine
Tetrakis-(4-carboxphenyl) porphine
Anthracene-2,3-dicarboxaldehyde
5-((5-aminopentyl)thioureidyl) eosin, hydrochloride
N-(ethoxycarbonylmethyl)-6-methoxyquinolinium bromide
MitoFluor green
5-aminoeosin
4'(aminomethyl)fluorescein, hydrochloride
5-(aminomethyl)fluorescein, hydrochloride
5-(aminoacetamido)fluorescein
4'((aminoacetamido)methyl) fluorescein
5-((2-(and-3)-S-acetylmercapto) succinoyl)amino-fluorescein
8-bromomethyl-4,4-difluoro-1,3,5,7-tetramethyl-4-bora-3a,4a,diaza-s-indacene
5-(and-6)-carboxy eosin
Cocchicine fluorescein
Casein fluorescein
3,3'-dipentyloxacarbocyanine iodide
3,3'-dihexyloxacarbocyanine iodide
3,3'-diheptyloxacarbocyanine iodide
2'-7'-difluorofluorescein
BODIPY FL AEBSF
Fluorescein-5-maleimide
5-iodoacetamidofluorescein
6-iodoacetamidofluorescein
Lysotracker green
Rhodamine 110
Arsenazo I
Aresenazo III sodium
Bismarck brown Y
Brilliant Blue G
Carmine
b-carotene
Chlorophenol red
Azure A
Basic fuchsin
di-2-ANEPEQ
di-8-ANEPPQ -continued di4-ANEPPS
di-8-ANEPPS
where ANEP
= (aminonaphthylethenylpyridinium)

The light-sensitive material may be applied to any substrate such as a package or product, by any technique capable of causing the light-sensitive material to adhere to the substrate, including any technique by which conventional inks may be transferred. For example, any kind of printer can be used, such as a multi-color printing press, an ink jet printer, a dot matrix printer (where the ribbon is soaked with the light-sensitive compound), silk screening, or pad printing. Alternatively, the light-sensitive material may be first applied to a decal or adhesive label which is in turn applied to the substrate. Preferably, an ink jet printer is used, as information that may be printed may be changed.

Using an ink jet printer may also be advantageous because reservoirs having different light-sensitive materials may be readily changed depending upon the product, customer, date and/or place of manufacture or any other data. In addition, ink jet printers are commonly used to print the bar code on a label or directly on the package itself. It is to be appreciated that the authenticating mark may be configured to any desired pattern ranging from a single dot that may convey no more information than what is contained in the ink formulation to a bar code to a more complex pattern that may convey information related to, for example, product, date, time, location, production line, customer, etc.

In another embodiment, there is employed optical state change security materials where the data read upon a first read is different from the data when the same spot is read a second time after 200 ms seconds has elapsed. Preferably, the optical state change security material is a transient optical state change security material.

As would be understood by one of ordinary skill in the art, the persistence of the activated state of the light-sensitive material, such as a light-changeable material, (i.e., the length of time the material is in the activated state versus initial state) and the delay in the conversion of the initial state to the activated state (i.e., the length of time it takes the material to enter the activated state from the initial state) may be measured parameters indicative of authenticity. Light-sensitive materials may be chosen from any material, compound or combination of compounds that serve to change the output signal from the medium upon re-reading. These materials include, without limitation, delayed light-emissive materials, delayed light-absorbing materials and other light-changeable compounds. A layer in the medium that becomes reflective upon re-reading may also be useful in predictably altering the output of the medium.

The light-sensitive materials of the present invention may be either organic or inorganic in nature, a combination of both, or mixtures thereof. The materials preferably demonstrate delayed response to the wavelength(s) of light to which they are sensitive, such that the data can be read by the reader in at least a first intended form upon initial read, and upon re-sampling in at least a second intended form.

Table 1 provides some organic dyes that may be useful with the invention.

TABLE 1

| Dye Name/No | Excitation | Emission |
| --- | --- | --- |
| Alcian Blue (Dye 73) | 630 nm | Absorbs |
| Methyl Green (Dye 79) | 630 nm | Absorbs |
| Methylene Blue (Dye 78) | 661 nm | Absorbs |
| Indocyanine Green (Dye 77) | 775 nm | 818 nm |
| Copper Phthalocyanine (Dye 75) | 795 nm | Absorbs |
| IR 140 (Dye 53) | 823 nm (66 ps) | 838 nm |
| IR 768 Perchlorate (Dye 54) | 760 nm | 786 nm |
| IR 780 Iodide (Dye 55) | 780 nm | 804 nm |
| IR 780 Perchlorate (Dye 56) | 780 nm | 804 nm |
| IR 786 Iodide (Dye 57) | 775 nm | 797 nm |
| IR 768 Perchlorate (Dye 58) | 770 nm | 796 nm |
| IR 792 Perchlorate (Dye 59) | 792 nm | 822 nm |
| 1,1'-DIOCTADECYL-3,3,3',3'-TETRA-METHYLINDODI-CARBOCYANINE-IODIDE (Dye 231) | 645 nm | 665 nm |
| 1,1'-DIOCTADECYL-3,3,3',3'-TETRA-METHYLINDO TRICARBOCY-ANINE IODIDE (Dye 232) | 748 nm | 780 nm |
| 1,1',3,3,3',3'-HEXAMETHYL-INDODI-CARBOCYANINE IODIDE (Dye 233) | 638 nm | 658 nm |
| DTP (Dye 239) | 800 nm (33 ps) | 848 nm |
| HITC Iodide (Dye 240) | 742 nm (1.2 ns) | 774 nm |
| IR P302 (Dye 242) | 740 nm | 781 nm |
| DTTC Iodide (Dye 245) | 755 nm | 788 nm |
| DOTC Iodide (Dye 246) | 690 nm | 718 nm |
| IR-125 (Dye 247) | 790 nm | 813 nm |
| IR-144 (Dye 248) | 750 nm | 834 nm |

As also stated above, the light-sensitive materials may also be inorganic in nature. Inorganic compounds find particular use in the present invention when the light-sensitive material is desired to be functional for long periods of time on the item and/or packaging surrounding the item. Inorganic compounds are less prone to degrade when exposed to repeated laser challenges.

Inorganic compounds capable of light-emission may find use in the present invention. Compounds such as zinc sulfide (ZnS) at various concentrations (Seto, D. et al., Anal. Biochem. 189, 51–53 (1990)), and rare earth sulfides and oxysulfides, such as, but not limited to, ZnS $SiO_2$, ZnS—$SiO_4$, and $La_2O_2S$ are known to be capable of emitting phosphorescence at certain wavelengths. Such inorganic light emissive compounds may be used advantageously with a metal ion such as manganese (Mn), copper (Cu), europium (Eu), samarium (Sm), $SmF_3$, terbium (Th), $TbF_3$, thulium (Tm), aluminum (Al), silver (Ag), and magnesium (Mg). Phosphorescent and luminescent properties of the compounds can be altered in a ZnS crystal lattice, for example, the delay time and wavelength of emission be controlled by changing the metal ions used for binding (See, e.g., U.S. Pat. No. 5,194,290).

Inorganic phase change materials can also be used. Particularly useful inorganic phase change materials include chalcogenide materials such as GeSbTe, InSbTe, InSe, AsTeGe, TeOx-GeSn, TeSeSn, SbSeBi, BiSeGe and AgInSbTe-type materials which can be changed from an amorphous state to a crystalline state by absorption of energy from particular light sources. The inorganic compound(s) may be used in numerous forms as would be understood by one of ordinary skill in the art, including, without limitation, in very fine particle size, as dispersions or packed within a crystal lattice (See, e.g., Draper, D. E., Biophys. Chem. 21: 91–101 (1985)).

In another embodiment, a transient optical state change security material or other phase change material is placed over a digital data recording on the item, and/or package material associated with the item, such that the digital data read is altered depending upon the phase of the material. A phase change may be timed such that the data underlying the phase change material can be read before the change occurs. The phase change advantageously should be persistent enough that upon re-sampling a different data read is obtained, and yet not too persistent such that the underlying data is obfuscated for significant periods of time. Authentication software may be keyed to the period of time involved in the change of phase and/or return to original phase.

The light-sensitive materials can be broadly applied to any substrate. Advantageously, the dye will be invisible so its presence will not affect the packaging. Various methods for application include DOD, ink jet printing, aerosol spraying or dipping the substrate.

In one embodiment in order to write data to the substrate, a change is be made to the dye. One of the most common ways to do this is with a laser such as is used in a CD-R writer, although the present invention is not limited in this respect. This laser heats up the dye to cause a change in its properties. These changes can be made precisely and rapidly.

In one embodiment a laser changes the light-sensitive material from light emissive to light absorptive. In another embodiment the laser changes the light-sensitive material from light absorptive to light emissive. In yet another embodiment the laser changes the light-sensitive material from transparent to light emissive. In another embodiment the laser changes the light-sensitive material from transparent to light absorptive. In all these cases a pattern is formed by light and dark areas by contrasting the dye before the laser has treated it and after treated with a laser. It is the contrasting pattern which is used to form letters, numbers, symbols or barcode patterns, etc., for a reader to pick up.

Various methods and apparatuses can be used to read the substrate and the alternating patterns of light and dark, as the present invention is not limited in this respect. Some of these are dependant on whether the dye is absorptive of emissive. One method is similar to a standard barcode reader. This system uses light reflected from the surface of the substrate. Where the light-sensitive material is absorptive, the amount of light reflected is less than where the light-sensitive material is not. Thus the reader will pick up a pattern of alternating light and dark areas. If the light-sensitive material is light emissive then the reader will need to filter out the excitation light and only allow the light emitted in, for example using a one pixel ratiometric camera that takes advantage of a change in ratio in the light-sensitive material in addition to the light and dark patterns set up by the laser.

Data applied to substrates may be encrypted to further increase security. The combination of data encryption, use of symbols (bar codes) or characters, and one or more invisible dyes that emit/absorb at different wavelengths results in a method of reliable product authentication and identification. The type of encryption used is variable and depends on the users requirements. As would be understood by one of ordinary skill in the art, all methods of digital encryption available today or in the future would be applicable to this technology. Public key encryption algorithms, such as RSA, as well as all adaptations of 128 bit encryptions, modified versions of DES and IDEA, are suitable, as well as encryption methods using combination of the aforementioned. Data will also be encrypted when meaningful text/digits are transcribed to the symbols chosen for the particular media.

In one embodiment of the invention, barcoding symbology to represent the digital data may be employed. A bar code 'symbology' is the way information is represented in a bar code, i.e., how the thin lines and thick lines (or other elements) represents data. There are two types of bar code symbologies: continuous and discrete.

Discrete bar codes start with a bar, end with a bar, and have a space between characters, referred to as an intercharacter gap. Continuous bar codes start with a bar, end with a space, and have no intercharacter gap. Hundreds of different bar code symbologies exist in theory, but only a handful are used extensively in commerce and industry.

The structure of the barcode consists of the height and the width. Information is encoded into spaces and bars of various width. The height of the barcode does not hold any information. Using the height, however, you can enlarge a barcode for easy scanning or for better visibility. The number of characters are represented in a linear inch called the barcode density. The density depends on the symbology. For example, using Code 39, 9.4 characters can fit in one inch. When using Interleaved 2 of 5, 17.8 characters can fit in one inch. The resolution of a barcode is dependent on the narrowest element of a barcode (X dimension), and can vary from high resolution—nominally less than 0.009 in. (0.23 mm), medium resolution—between 0.009 in. (0.23 mm) and 0.020 in. (0.50 mm), and low resolution—greater than 0.020 in. (0.50 mm).

Currently there are more than 400 barcode symbologies in use. Some are alphanumeric, while others contain the full ASCII set, or only numeric data. Only 10 are standardized and prevalent in industry. This embodiment could include, but is not limited to, the following examples of bar coding symbologies:

Code 39: Code 39 is the most widely used barcode. It is an alphanumeric code, which supports both numbers and capital letters. The barcode has a total of 9 elements, 5 bars, and 4 spaces for each barcode character. Code 39 is used for shipping departments and product descriptions.

UPC: UPC-consists of the following subsets:
  UPC-A—UPC-A is a barcode used to encode a 12 digit number. The digits are arranged in the following manner: The first digit is the number system character, the following ten digits are the data characters, and the final digit is the checksum character. UPC-A is used by grocery stores within the United States;
  UPC-E—UPC-E is the smallest barcode available because it is a zero suppressed version of the UPC-A barcode. The data characters and the checksum characters are all condensed into six characters. UPC-E is used with the small EAN-8 bar code, has two country characters (which identify the country of origin), 5 data characters, and a checksum character. The EAN-8 is used for applications overseas;
  EAN-13—EAN-13 has two country characters, ten data characters, and a checksum character. Thus, EAN-13 encodes 13 characters. The EAN-13 is mostly used in grocery stores in Europe;
  Interleaved 2 of 5—Interleaved 2 of 5 is a numeric code only. There are five elements to each character, two wide and three narrow. This code is also capable of having from 2 to 30 digits. It also requires an even number of digits to be encoded;
  Code 128—Code 128 is used for all numeric bar codes or alphanumeric barcodes. It is also a high density bar code which can encode the entire 128 ASCII character set. It is also capable of encoding two numbers into one character width, called double density.
  UCC-128—UCC-128 is a subset of Code 128. It is a 19 digit fixed length bar code which uses the double density numeric Code 128 C to create the bar code.

The UCC-128 is often used for shipping containers.

Another embodiment of the invention includes automatic error checking of the digital content. An example of said error checking would include but not be limited to the use of a checksum character as is commonly used in bar coding symbology. A checksum is a count of the number of bits in a transmission unit that is included with the unit so that the receiver can check to see whether the same number of bits arrived. If the counts match, it's assumed that the complete transmission was received. The generation of the checksum character can vary from one type of symbology to another. However most symbologies checksum is obtained by taking the modulus 10 of sum of all of the characters in the string.

In another embodiment of the invention the data string stored represented on the package can be compressed. One example of compression would include but is not limited to the use of hexidecimal format. At its simplest, hex numbers are base 16 (decimal is base 10). Instead of counting from 0 to 9, as we do in decimal, and then adding a column to make 10, counting goes from 0 to F before adding a column. The characters A through F represent the decimal values of 10 through 15 as illustrated below:

| decimal | 0 1 2 3 4 5 6 7 8 9 10 11 12 13 14 15 |
|---|---|
| Hex | 0 1 2 3 4 5 6 7 8 9 A B C D E F |

Another way to explain hex is, each column in a hex number represents a power of 16. The compression technique used could include hexidecimal or any other custom compression algorithm.

STATEMENT REGARDING PREFERRED EMBODIMENTS

While the invention has been described with respect to preferred embodiments, those skilled in the art will readily appreciate that various changes and/or modifications can be made to the invention without departing from the spirit or scope of the invention, in particular the embodiments of the invention defined by the appended claims. All documents cited herein are incorporated in their entirety herein.

What is claimed is:

1. An adhesive tape operationally positioned on a package to allow access to the contents of the package when pulling said adhesive tape after verification of an authentication mark, said adhesive tape being in a layered form comprising a first non-adhesive longitudinal surface and a second longitudinal surface, wherein a layer deployed on said second longitudinal surface comprises said verification mark in the form of a light-sensitive security material, capable of transient optical state change from a first optical state to a second optical state when illuminated by a light source of a defined wavelength, followed by a timed return to said first optical state, which time is compared with a reference time; and an adhesive layer coating said light-sensitive security material.

2. The tape of material of claim 1 wherein a transient optical state change security material comprises: a band which is coated on either or both sides of said longitudinal surfaces with said transient optical state change security material.

3. The-tear tape of claim 1 further comprising a hologram.

4. The tape of claim 1 wherein material changes from light emissive to light absorptive.

5. The tape of claim 1 wherein material changes transparent to light absorptive mode.

6. The tape of claim 1 wherein material is sensitive to defined infrared wavelengths.

7. A method for verifying an authentication mark comprising transient optical state change security material, said method comprising the steps of:
   a) illuminating the authentication mark with a wavelength causing said transient optical state change security material to change optical state from a first optical state to a second optical state;
   b) determining the time taken for reversion of the transient optical state change security material from said second optical state to said first optical state;
   c) comparing the time in step (b) with a reference time for optical state change to verify the authentication mark.

8. A method for providing an authenticity mark on an item, said method comprising the steps of:
   incorporating onto the packaging of a product a tape comprising a light-sensitive security material capable of transient optical state change from a first optical state to a second optical state activated by a defined wavelength of light;
   selectively exposing select locations of said light-sensitive security material to said defined wavelength of light causing changes in the optical state of the light-sensitive security material from a transient to a permanent optical state at the select locations decipherable as digital data; and
   comparing the time of change with a reference time for optical state change to verify the authentication mark.

9. A method of authenticating an item associated with a packaging comprising digital data recorded on a tape operationally positioned on a package to allow pulling and access to the contents of the package when pulled, said tape comprising activated light-sensitive security material capable of transient optical state change activated by a defined wavelength of light from a first optical state to a second optical state, wherein activation and reversion from activation can be measured in time, said method further comprising the steps of:
   a) scanning the package with an optical reader to decipher the digital data represented by the activated light-sensitive security material on said packaging; and
   b) authenticating the item if the digital data of step (a) matches a standard of digital data that should be on a genuine item.

10. The method of claim 9 wherein said defined wavelength light-sensitive security material is a recording dye.

11. A method of providing an authenticity mark on an item comprising incorporated thereon discernible optically recorded forms comprising digital information, said method further comprising the steps of: operationally overlaying a timed transient optical state change security material, which is capable of existing in a first optical state and a second optical state and transiently changing said optical states under illumination with a defined wavelength of light, over said optically recorded forms wherein its first state comprises the digital information that is true to the optically recorded forms, wherein its second optical state comprises the digital information that is altered with respect to the optically recorded forms, and wherein activation and reversion from activation of the transient optical state change security material can be measured in time.

12. A method for authenticating an authenticity mark on an item comprising a transient optical state change security material overlaid on optically recorded forms comprising digital information, said method comprising the steps of:
a) reading said digital information when said transient optical state security material is in a first optical state and a second optical state;
b) comparing said digital information read when said transient optical state security material can change from and to said first optical state and said second optical state with a reference read of said digital information on an authentic item wherein the transient optical state change security material comprises both said first optical state and said second optical state which changes between optical states can be authenticated by being measured in time.

13. The method of claim 12 wherein said authenticity mark on said item further comprises a tear tape.

14. The method of claim 13 wherein said tear tape further comprises a hologram.

* * * * *